US010351234B1

(12) United States Patent
Dennis

(10) Patent No.: US 10,351,234 B1
(45) Date of Patent: Jul. 16, 2019

(54) VERTICAL TAKEOFF AND LANDING VEHICLE

(71) Applicant: Jeremy Dennis, Jamestown, NC (US)

(72) Inventor: Jeremy Dennis, Jamestown, NC (US)

( * ) Notice: Subject to any disclaimer, the term of this patent is extended or adjusted under 35 U.S.C. 154(b) by 549 days.

(21) Appl. No.: 15/165,609

(22) Filed: May 26, 2016

Related U.S. Application Data

(60) Provisional application No. 62/166,908, filed on May 27, 2015.

(51) Int. Cl.
| *B64C 13/04* | (2006.01) |
| *B64C 13/12* | (2006.01) |
| *B64C 27/20* | (2006.01) |
| *B64C 29/00* | (2006.01) |
| *B64C 3/38* | (2006.01) |

(52) U.S. Cl.
CPC ............ *B64C 29/0033* (2013.01); *B64C 3/38* (2013.01); *B64C 13/04* (2013.01); *B64C 13/12* (2013.01); *B64C 27/20* (2013.01); *B64C 2201/027* (2013.01); *B64C 2201/146* (2013.01)

(58) Field of Classification Search
CPC ......... B64C 27/08; B64C 27/20; B64C 27/52; B64C 13/04; B64C 13/12; B64C 13/14; B64C 29/0033; B64C 29/0075; B64C 2201/027; B64C 2201/146
See application file for complete search history.

(56) References Cited

U.S. PATENT DOCUMENTS

| 4,227,428 | A | * | 10/1980 | Zifferer | B63H 21/213 74/526 |
| 5,065,962 | A | * | 11/1991 | Adams | B64D 31/04 244/175 |
| 6,471,159 | B1 | * | 10/2002 | Bundo | B64B 1/06 244/25 |
| 6,672,412 | B1 | * | 1/2004 | Charlson | B62D 11/04 180/6.48 |
| 6,892,980 | B2 | * | 5/2005 | Kawai | B64C 29/0033 244/12.4 |
| 7,874,515 | B2 | * | 1/2011 | Kinkopf | B64B 1/32 244/56 |
| 2012/0330481 | A1 | * | 12/2012 | Feldkamp | G06F 17/00 701/2 |
| 2014/0374541 | A1 | * | 12/2014 | Wang | B64C 39/024 244/236 |
| 2015/0225071 | A1 | | 8/2015 | Tighe | |
| 2016/0023755 | A1 | * | 1/2016 | Elshafei | B64C 29/0033 244/17.13 |

(Continued)

*Primary Examiner* — Richard R. Green
(74) *Attorney, Agent, or Firm* — Tuggle Duggins P.A.; Blake Hurt

(57) ABSTRACT

An aircraft capable of vertical takeoff and landing (VTOL) including one or more propulsion systems gyroscopically mounted (i.e. rotatable about x- and y-axes) to a rigid airframe is disclosed. Each "wing" includes a propulsion system mounted to an axle that is rotatably attached to a wing mount, which in turn is pivotably mounted to the exterior of the airframe. The propulsion systems are electronically grouped according to their position relative to the airframe, such that one controller can control all the propulsion systems on the right or left side of the aircraft, resulting in control logic that is far more intuitive and convenient than that taught in the prior art. A method of operating an aircraft utilizing this improved control logic is also disclosed.

18 Claims, 6 Drawing Sheets

(56) References Cited

U.S. PATENT DOCUMENTS

2016/0031554 A1* 2/2016 Eshkenazy ............ B64C 39/024
 244/6
2016/0347443 A1* 12/2016 Lee .................... B64C 27/52
2016/0375982 A1* 12/2016 Rifenburgh ............ B64C 13/04
 244/17.19

* cited by examiner

VERTICAL TAKEOFF AND LANDING VEHICLE

This non-provisional patent application claims all benefits under 35 U.S.C. § 119(e) of U.S. provisional patent application Ser. No. 62/166,908 filed 27 May 2015, entitled "VERTICAL TAKEOFF AND LANDING AIRCRAFT", in the United States Patent and Trademark Office, which is incorporated by reference in its entirety herein.

FIELD OF THE INVENTION

The invention herein pertains to air systems and particularly pertains to a vertical takeoff and landing (VTOL) aircraft utilizing a specialized air frame in combination with controls more intuitive than those taught in the prior art to produce unexpected maneuverability and performance.

DESCRIPTION OF THE PRIOR ART AND OBJECTIVES OF THE INVENTION

As the cost and security concerns associated with runways have increased, the need for aircraft that do not require them has become more acute. Vertical takeoff and landing (VTOL) aircraft are known in the art as a solution to reduce the reliance on runways while maintaining the range and speed associated with air travel or transportation. One common VTOL orientation is that of a tilt-rotor design, where typically two larger propellers are mounted to the ends of an abbreviated wing that is engineered to tilt the rotors from a vertical position to a horizontal position for normal flight. A significant drawback that this design produces is an inherent "danger zone" of time, whereby the lift of the aircraft is reduced as its wings and propellers are rotated from the horizontal "hover" position to the vertical "flight" position. One example of the above example is embodied by the U S military's V-22 "Osprey" aircraft.

Another common VTOL configuration is known as redirected thrust. Although technically the same in terms of physics, these craft are usually powered by turbofan or jet engines, which produce tremendous amounts of directed thrust, which is then redirected downward for vertical takeoff and tilted or redirected rearward to propel the plane into forward flight. The same danger of losing lift as experienced by tilt-rotor aircraft is present with the redirected thrust vehicles. However, the danger zone is greatly reduced, because of the significantly greater horsepower-to-weight ratio produced by the redirected thrust engines. A common embodiment of redirected thrust is the British military's AV-8 Harrier fighter jet. In addition to the conventional helicopter, there are numerous designs of VTOL aircraft embodied in the prior art that have thrust members completely exposed to the exterior of the craft.

In addition to propellers and jet engines, other mechanisms to produce thrust are known in the art. Some vehicles rely on propellers that are installed inside circular cavities, shrouds, ducts or other types of nacelle, where the propeller or rotor is not exposed, and where the flow of air takes place inside the circular duct, instead of outside it. Most ducts have uniform cross-sections with the exit area (usually at the bottom of the duct when the vehicle is hovering) being similar to that of the inlet area (at the top of the duct). Some ducts, however, are slightly divergent, having an exit area that is larger than the inlet area, as this was found to increase efficiency and reduce the power required per unit of lift for a given inlet diameter. Some ducts further have a wide inlet lip in order to augment the thrust obtained, especially in hover. For these types of vehicles, maintaining control relies on utilizing the rotors or propellers themselves, or the flow of air that they produce to create control forces and moments and forces around the vehicle's center of gravity. One method, which is very common in helicopters, is to mechanically change, by command from the pilot, the pitch of the rotating rotor blades both collectively and cyclically, and to modify the main thrust as well as moments and/or inclination of the propeller's thrust line that the propeller or rotor exerts on the vehicle. Some VTOL vehicles using ducted or other propellers that are mounted inside the vehicle also employ this method of control. Designers may choose to change only the angle of all the blades using ducted or other propellers that are mounted inside the vehicle for this method of control. The angle of all the blades may be changed simultaneously (termed collective control) to avoid the added complexity of changing the angle of each blade individually (termed cyclic control), but this may reduce the performance of the craft in flight. On vehicles using multiple fans which are relatively far from the center of gravity, different collective control settings can be used on each fan to produce the desired control moments. The disadvantage of using collective controls, and especially cyclic controls, lies in their added complexity, weight and cost. Therefore, a simple thrust unit that is also able to generate moments and side forces, while still retaining a simple rotor not needing cyclic blade pitch angle changes, has an advantage over the more complex solution.

Thus, in view of the problems and disadvantages associated with prior art devices, the present invention was conceived and one of its objectives is to provide an aircraft powered by multiple propulsion systems such as ducted fans.

It is another objective of the present invention to provide an aircraft with one or more propulsion systems that are gyroscopically mounted to an airframe to permit adjustments along the x- and y-axes congruently.

It is still another objective of the present invention to provide an aircraft controlled by one or more joystick-style control sticks.

It is yet another objective of the present invention to provide an aircraft with controls embodied by a pair of joysticks, each joystick configured to control the propulsion system(s) on a right or left side of the aircraft, respectively.

It is a further objective of the present invention to provide an aircraft with a body generally defining an X shape powered by four (4) ducted fans gyroscopically mounted to the respective outboard corners of the craft.

It is still a further objective of the present invention to provide an aircraft with propulsion systems that are grouped for control of the respective group in unison.

It is yet a further objective of the present invention to provide an aircraft with propulsion systems that are grouped for control in view of their position on the aircraft, for example front-back groups or left-right groups.

It is another objective of the present invention to provide an aircraft with joystick-style controls, a first joystick for controlling the attitude, altitude, and power distribution of a first grouping of propulsion systems, a second joystick for controlling the attitude, engine speed, and power distribution of a second grouping of propulsion systems.

It is still another objective of the present invention to provide an aircraft with control logic of grouped propulsion systems that mimics the manual inputs at one or more control joysticks, for example tilting the right joystick forward causes the "right" grouped propulsion systems to tilt forward.

It is a further objective of the present invention to provide an aircraft with a trigger-style throttle control, whereby selectively depressing the trigger corresponds to a respective increase or decrease in throttle output.

It is still a further objective of the present invention to provide an aircraft with an adjustable control modulator that can distribute power between the grouped propulsion systems, for example causing a right rear propulsion system to produce more thrust than a right front propulsion system.

It is another objective of the present invention to provide an aircraft with a thumb-manipulated, adjustable control modulator that can distribute power between grouped propulsion systems as described above, the thumb modulator positioned in opposing relation relative to the trigger throttle control with respect to the joystick.

It is yet another objective of the present invention to provide an aircraft with control logic configured to adjust roll, pitch, and yaw of the craft without altering the spatial aerial location of the aircraft.

It is another objective of the present invention to provide an aircraft with control logic configured to adjust the roll, pitch, and yaw of the craft without altering the velocity vector of the aircraft.

Various other objectives and advantages of the present invention will become apparent to those skilled in the art as a more detailed description is set forth below.

SUMMARY OF THE INVENTION

The aforesaid and other objectives are realized by providing an aircraft capable of vertical takeoff and landing (VTOL) including one or more propulsion systems gyroscopically mounted (i.e. rotatable about x- and y-axes) to a rigid airframe. Each propulsion system mount includes motorized actuators that can position the propulsion system as desired when the aircraft receives a command signal. The aircraft also includes a control system defined by a pair of joystick-style control sticks that are manually engaged by a pilot to produce adjustments in the roll, pitch, and yaw of the craft. Each joystick includes a trigger-style throttle control that is selectively depressible to produce varying degrees of thrust as desired by the pilot. The respective joysticks also include a thumb-manipulated, adjustable control modulator that can distribute power between grouped propulsion systems as desired by the user. The one or more propulsion systems may be grouped into predetermined control sets defined by the position of the propulsion systems, for example front-back or left-right groupings. Each grouping is governed by the inputs of the respective joystick, for example by rotating the right joystick, the propulsion systems in the "right" grouping also rotate.

A method of controlling the propulsion systems utilizing a more intuitive control logic than known in the prior art is also provided. By providing an aircraft with propulsion systems that are grouped for control in view of their position on the aircraft, for example front-back groups or left-right groups, control logic can be deployed that can adjust roll, pitch, and yaw of the craft without altering the spatial aerial location of the aircraft (i.e. during hover). The control logic can also adjust the roll, pitch, and yaw of the craft without altering the velocity vector of the aircraft (i.e. during forward or rearward flight).

DETAILED DESCRIPTION OF THE PREFERRED EMBODIMENT AND OPERATION OF THE INVENTION

Figure 1:
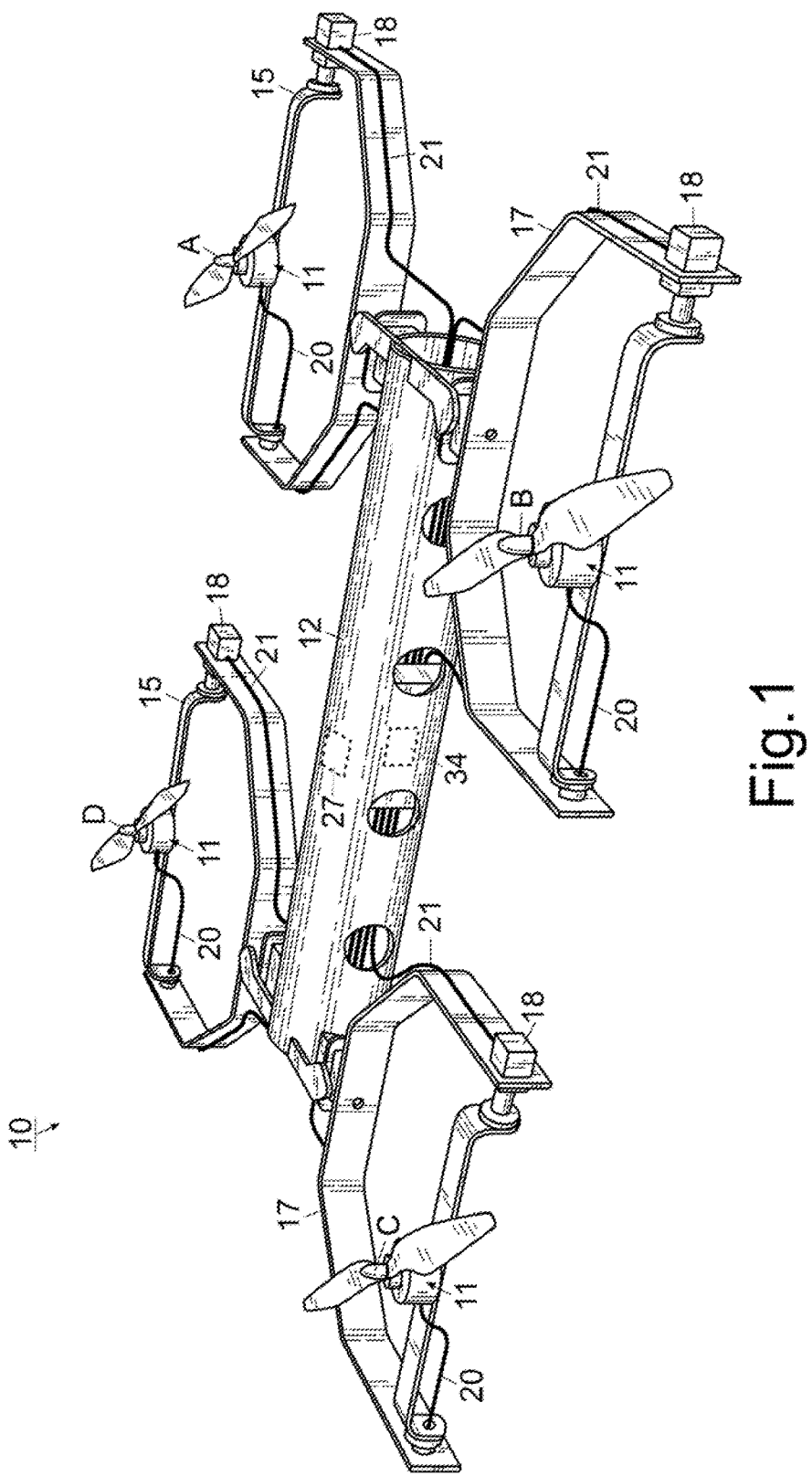
FIG. 1 shows an elevated side perspective view of the preferred embodiment of a vertical takeoff and landing aircraft.
Figure 2:
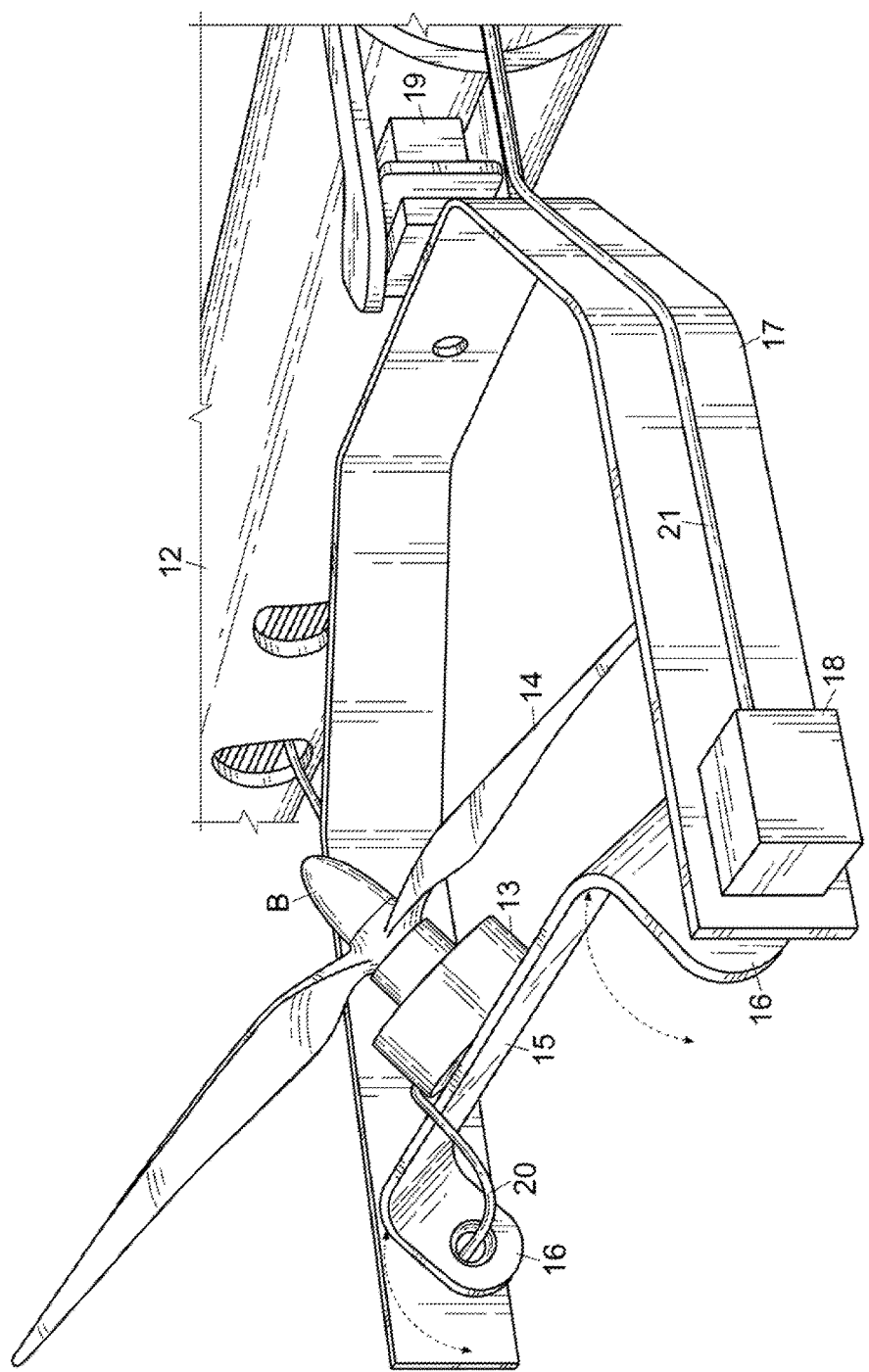
FIG. 2 pictures an enlarged, elevated side perspective view of a propulsion system pivoting about an axis.
Figure 3:
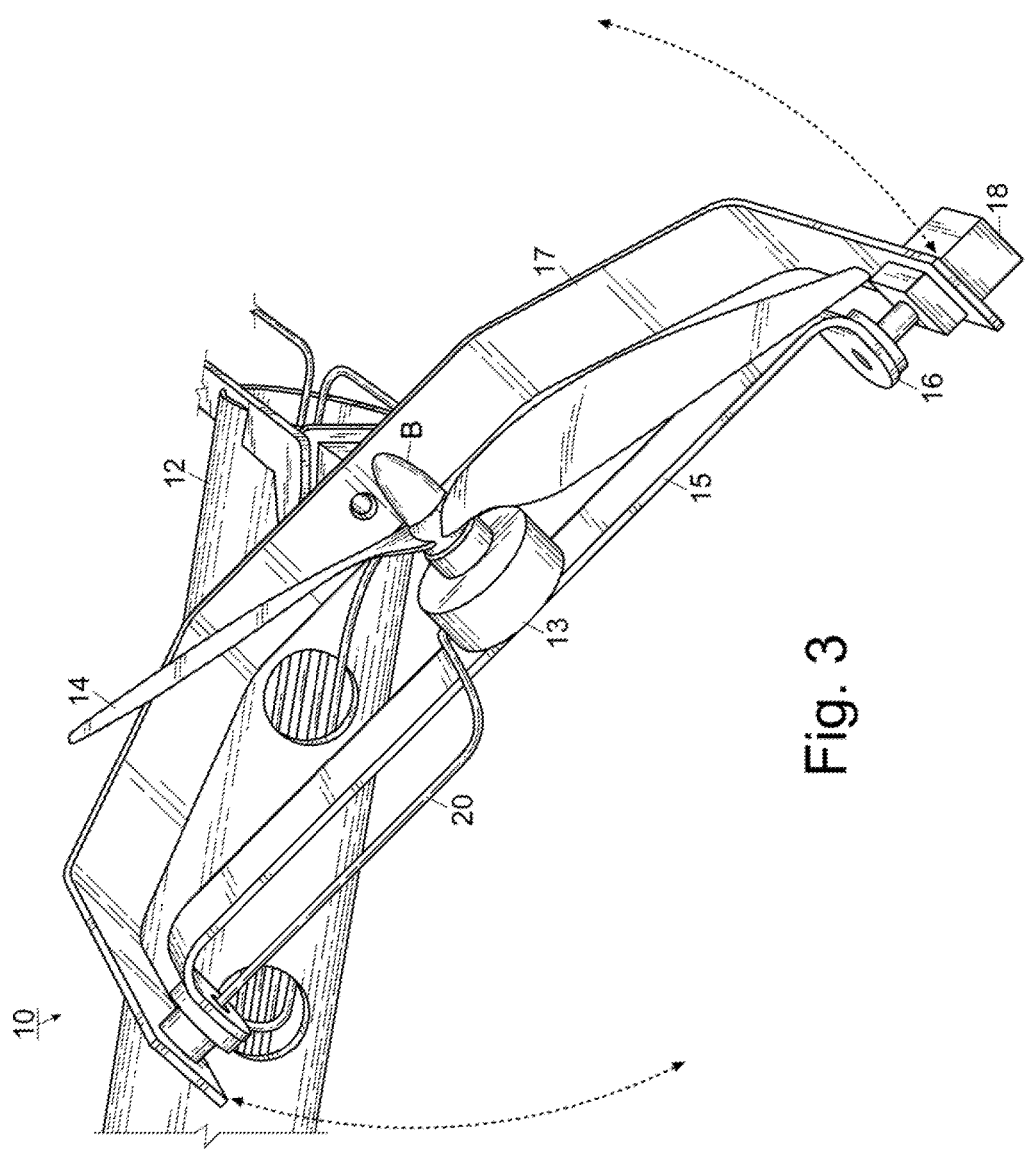
FIG. 3 depicts an enlarged, elevated side perspective view of a propulsion system pivoting about an axis.

For a better understanding of the invention and its operation, turning now to the drawings, FIGS. 1-3 show preferred aircraft 10 with a plurality of propulsion systems 11 positioned about the outboard periphery of airframe 12. Preferred propulsion system 11 is a ducted fan oriented with the openings perpendicular to the horizon (not shown), directing thrust along a vertical vector, but other propulsion members such as jet turbines, ducted fans with an end closed, pulse detonation engines, a-typical gear turbine engines, electrostatic ion thrusters, conventional propellers (as illustrated in FIGS. 1-3 for clarity and ease of demonstration), Sonic Blue electric S-MAGJET engines, Boeing PETA pulse jets, Pratt & Whitney PURE POWER P1000G engines, or the like may also be utilized in a similar manner. Regardless of the specific propulsion system 11, one or more propulsion systems 11 are mounted to airframe 12 and preferably two or more propulsion systems 11 for performance and redundancy reasons. The preferred attachment mechanism and method may be defined as gyroscopically, such that each propulsion system 11 can fully articulate about both the x- and y-axis, either independently or congruently with one or more additional propulsion systems 11, grouped as will be described further below. Similarly, preferred airframe 12 defines a personnel enclosure or cabin and a generally H- or X-shape, resulting in architecturally and aerodynamically advantageous mounting positions for propulsion systems 11 at the outer corner periphery thereof. However, other airframe 12 configurations are also contemplated within the scope of the instant invention.

FIG. 1 shows an elevated side perspective view of aircraft 10 with four (4) propulsion systems 11 mounted at the respective corners of airframe 12. Each propulsion system 11 is comprised of a motor, engine, or some other manner of power supply 13 and a fan, propeller, or blade 14 rotatably attached thereto. For ease of identification, propulsion systems 11 will be referred to herein as identified relative to their position with respect to aircraft 10. Propulsion systems A and B are positioned at the front left and front right locations of aircraft 10, while propulsion systems C and D are positioned at the rear right and left locations, respectively. This orientation allows stabilizing and directional thrust vectoring at all four corners, creating a stable and efficient aircraft. An exemplary mounting structure for propulsion systems 11 is displayed in FIG. 1, while examples of the functionality of a single propulsion system 11 are illustrated in FIGS. 2 and 3. Considered a gyroscopic mount or a universal joint, propulsion system 11 is pivotally mounted to aircraft 10 via a pair of perpendicularly oriented axles, permitting a full three hundred sixty degree (360°)

rotation about both lateral and longitudinal axes. This type of mount is performed with metallic or other load-bearing materials and may include bolts, screws, rivets, or other fasteners to attach the propulsion system 11 to aircraft 10. In one embodiment of aircraft 10, longitudinal axle 15 is defined by a flat bar oriented parallel to the longitudinal length of airframe 12, the flat bar preferably defining a pair of ears 16 perpendicularly positioned at opposing longitudinal ends of the flat bar. This configuration of the flat bar permits proper clearance of blade 14 from all aircraft 10 structures during movements as illustrated in FIGS. 2 and 3 which will be described in further detail below. Each longitudinal axle 15 is pivotably connected at opposing longitudinal ends via ears 16 to wing mount 17 and is preferably powered by actuator 18, which in turn may be powered by an onboard power supply such as a battery or the like (not shown) positioned within airframe 12. Wing mount 17 is a generally C-shaped member with planar sides that serves to provide structural support to longitudinal axle 15 during flight operations. As demonstrated in FIG. 3, each wing mount 17 may be rotatably attached to airframe 12, and is preferably powered by actuator 19 in a similar manner to actuator 18 as described above, serving as the laterally extending axle relative to aircraft 10. Actuators 18 and 19 are preferably electronically powered, rotary-style members that serve to rotate propulsion systems 11 into the desired position and orientation during flight activities, but other actuator types, for example hydraulic, pneumatic, or other actuators are also contemplated. Each propulsion system 11 may be in communication with an onboard power supply via wire connection 20 and actuators 18 may be in communication with the same, or a different power supply via wires 21 (actuators 19 may also be in communication with the same power supply or an independent power supply in view of actuators 18, but such is not shown). In an alternate embodiment one or more of actuators 18, 19 may include an integrated power supply, such that wire connections are not necessary.

FIGS. 4-7 demonstrate that preferred aircraft 10 includes at least one joystick-style controller 22. Each controller 22 includes control joystick 23 rotatably mounted to base 24, such that when a pilot manually engages controller 22, the manual inputs are transferred into base 24 and communicated to respective propulsion systems 11, for example by transmitter 25 (shown in dotted fashion to indicate presence within base 24) and associated antennae 26 in communication with receiver 27 onboard aircraft 10 (also indicated in ghost fashion). As would be understood, this communication of inputs and corresponding outputs may be performed by cables, electronic wires (i.e. "fly-by-wire"), hydraulic/mechanical, electrical/mechanical, optical wires, wireless transmitters and receivers coupled to the respective components, or any other manner known in the art. The preferred control logic embodied in the controls of embodiments of aircraft 10 and implemented onboard aircraft 10 via electronic instructions in the nature of software code stored on or executed by computing device 34 (shown in dotted fashion to indicate presence within airframe 12) rely on each of the joysticks 23 to be in communication with at least two propulsion systems 11, and further that the propulsion systems 11 and associated joystick 23 articulate in unison, that is to say input at joystick 23 creates corresponding articulation at each of the propulsion systems 11 associated therewith, specifically by virtue of rotation of longitudinal axle 15 and wing mount 17. Preferably, the respective joysticks 23 and propulsion systems 11 are grouped by side in relation to a midline longitudinal axis defined by aircraft 10 (i.e. right and left or starboard and port), such that propulsion systems 11 on the right side of aircraft 10 operate independently of propulsion systems 11 on the left side. This orientation and control logic may allow a pilot to move both sides in the same direction or vector, in opposing directions or vectors, or assign one set of propulsion systems in a neutral position or vector, allowing a full range of operational variation and control.

Figure 4:
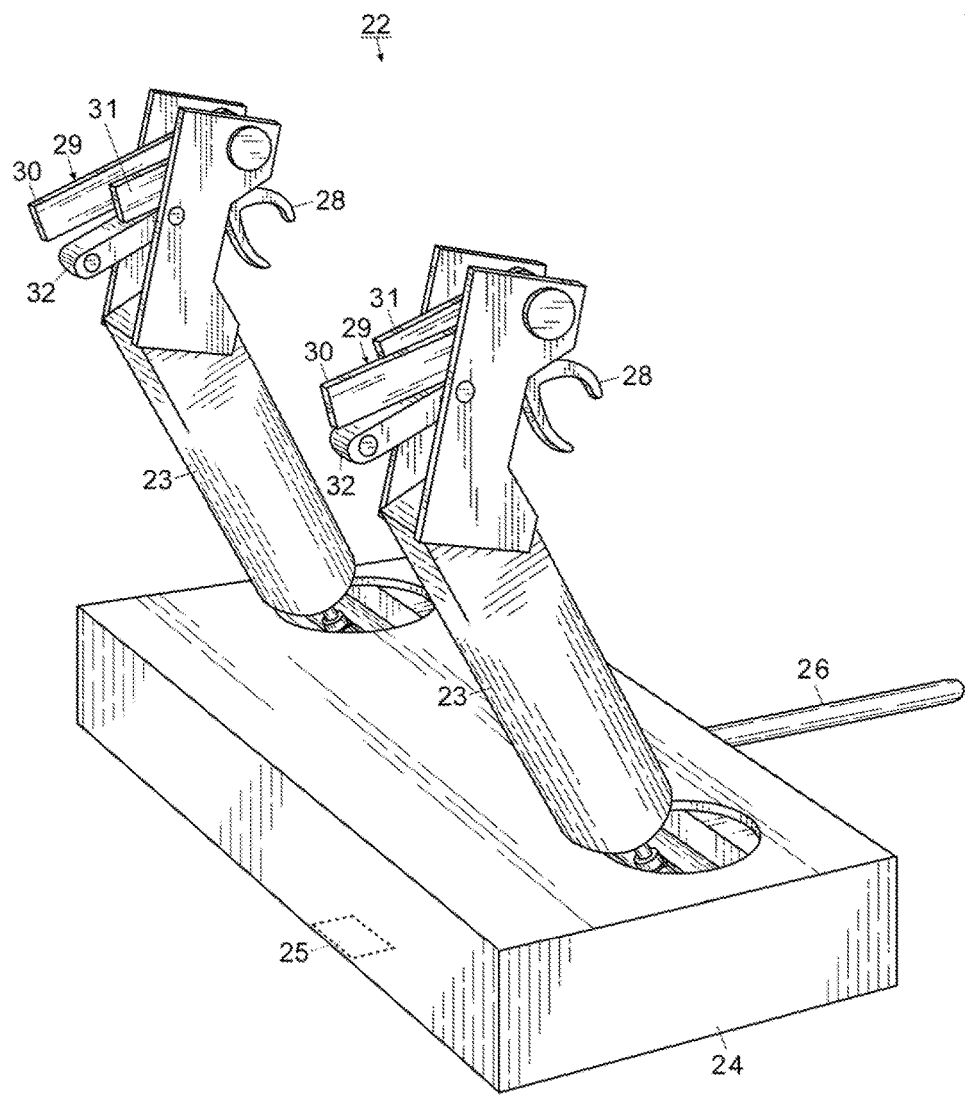
FIG. 4 demonstrates an elevated side perspective view of the preferred embodiment of the controls of the aircraft of FIG. 1.

FIG. 4 demonstrates an elevated side perspective view of an embodiment of joystick control 22 configured to control the attitude, engine speed, and engine power proportioning of the grouped propulsion systems 11 as previously described. The attitude of the grouped propulsion systems 11 are rotatably positioned as the joystick 23 is progressively tilted, for example forward or rearward from a vertical or neutral position (rearward position illustrated in FIG. 4). Propulsion systems 11 can rotate at a higher or lower ratio in relation to the displacement at the joystick to allow for more or less thrust vectoring while minimizing required input by the pilot. The engine speed or throttle may be controlled by a first input device positioned on joystick 23, in the preferred embodiment finger-operated, trigger-style throttle member 28. By selectively depressing trigger 28, a pilot may adjustably control the engine speed of the associated propulsion systems 11. Activating the respective trigger members 28 equally without displacing joysticks 23 from their vertical orientation will result in all propulsion systems 11 producing equal amounts of vertical thrust or lift, increasing altitude at a substantially level horizon. Correspondingly, reducing respective trigger members 28 will evenly decrease thrust or lift produced by propulsion systems 11, decreasing altitude at a substantially level horizon. Further, engaging one trigger member 28 to a greater extent than the other will result in one side of propulsion systems 11 producing greater thrust than the opposing side. This imbalance of lift is referred to as roll and is one method of turning aircraft 10. A manual or electronic failsafe or minimum throttle baseline may be included in the control logic to relieve the pilot of constant constriction of the finger during long periods of operation, ensuring that aircraft 10 does not inadvertently fall out of the sky. An alternate embodiment may mechanically bias (referred to as "stiction") to maintain joysticks 23 in a predetermined position during operation. Preferably, this stiction bias will hold joysticks 23 in the last position until the bias is overcome.

The engine throttle distribution or proportioning may be controlled by a second input device positioned on one or more joysticks 23, in the preferred embodiment thumb-engaged, adjustable control modulator 29 that is configured to deliver real-time or substantially real-time power adjustments between the fore and aft propulsion systems 11, preferably via electronic or radio communication (not shown) between modulators 29 and respective propulsion systems 11. For example, placing or leaving modulator 29 in a first, neutral position evenly distributes engine power between the front and rear propulsion systems 11. Manually rolling modulator 29 aft (i.e. towards the pilot or rearward) to a second position will progressively increase the thrust produced by the front propulsion system 11 on the respective side of aircraft 10. Correspondingly, rolling modulator 29 fore (i.e. away from the pilot or forward) to a third position will progressively increase the thrust produced by the rear propulsion system 11 on the respective side of aircraft 10. This selective engagement of modulators 29 fore or aft changes the longitudinal angle of aircraft 10, often referred to as pitch. Pitching embodiments of aircraft 10 up or down can have numerous aerodynamic and maneuvering benefits that are not discussed here.

Figure 6:
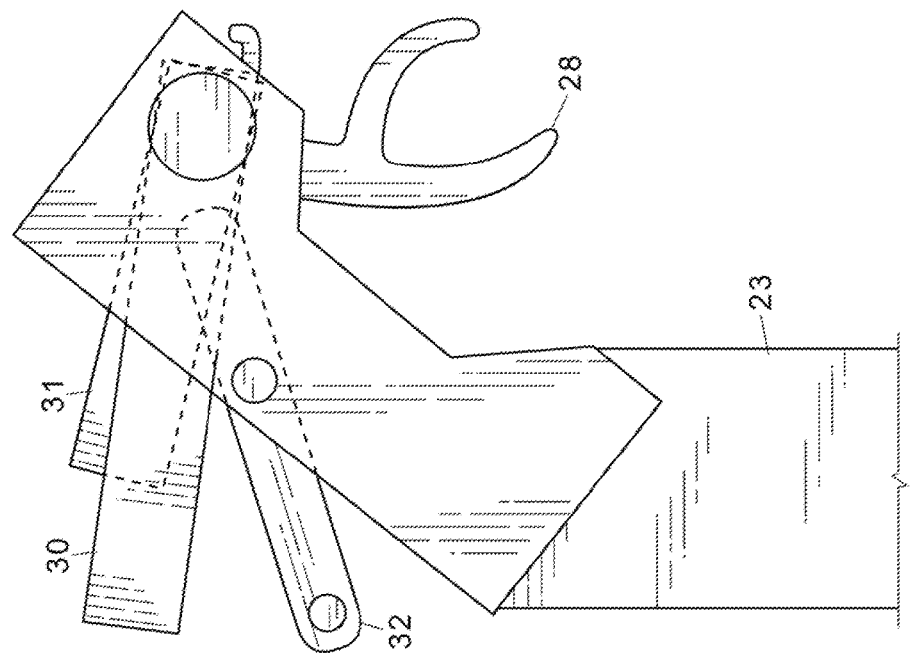
FIG. 6 features an elevated side view of one of the controls of FIG. 4.
Figure 5:
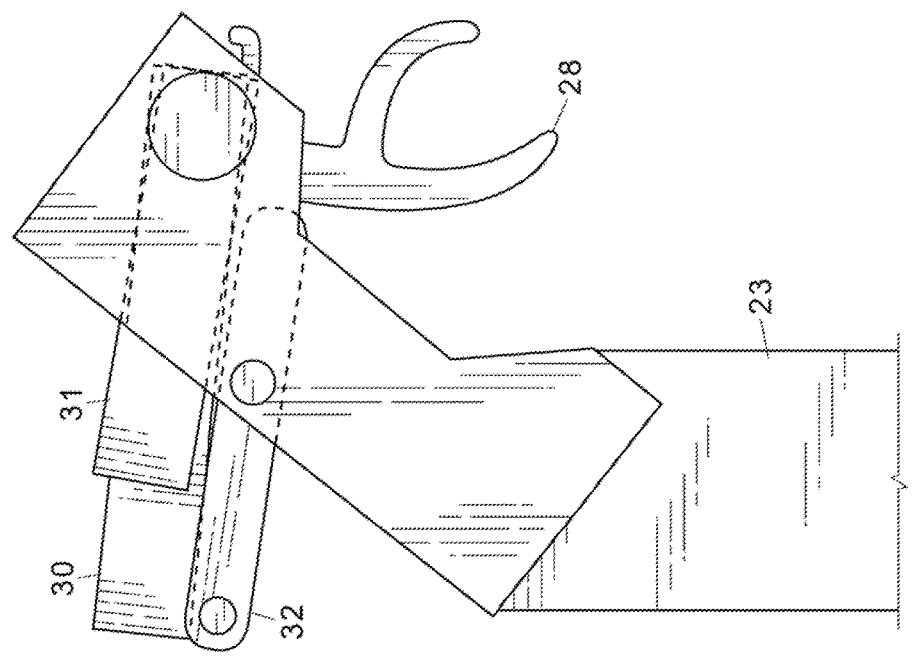
FIG. 5 illustrates an elevated side view of one of the controls of FIG. 4.
Figure 7:
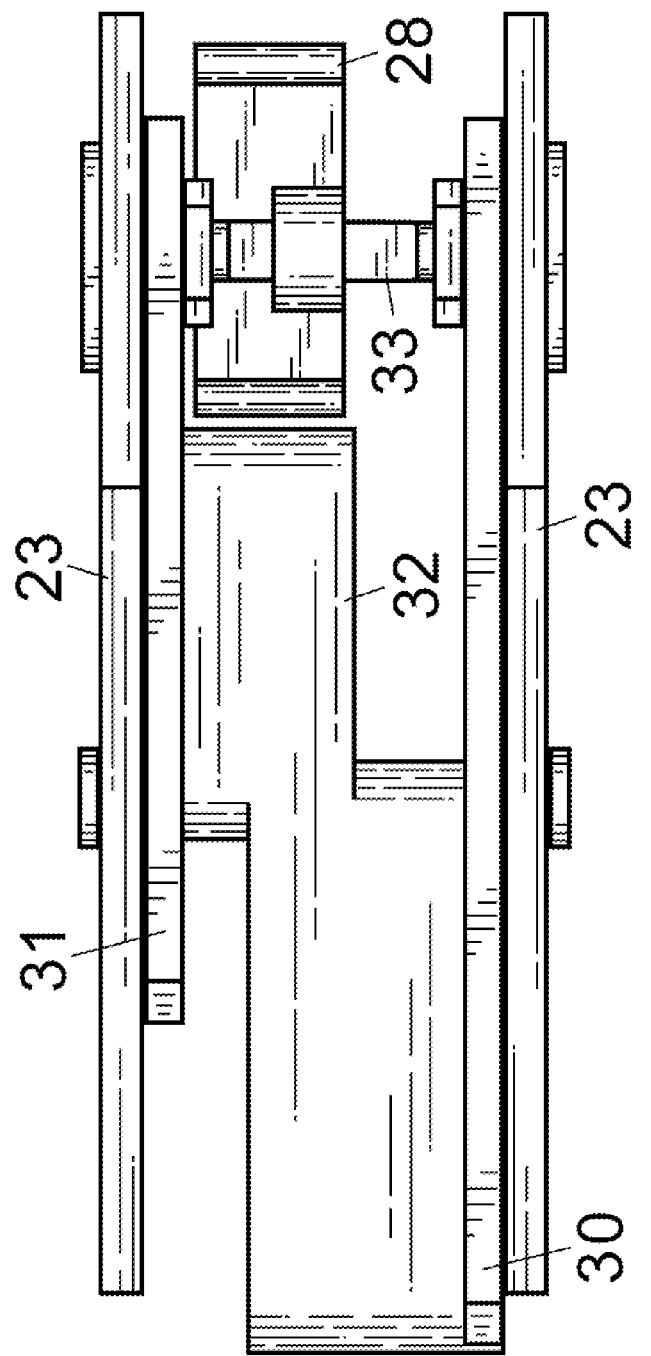
FIG. 7 shows a top plan view of one of the controls of FIG. 4.

As further shown in FIGS. 4-7, thumb-engaged, adjustable control modulators 29 are preferably formed by a pair of modulator alms 30, 31 and a base switch 32 rotatably affixed to the top of each joystick 23. As shown more clearly in FIG. 7 modulator arms 30 and 31 are generally rectangular planar members that are pivotably connected to joystick 23, an embodiment which may utilize the same rod 33 that carries trigger 28. Functionally, this permits engagement of trigger throttle 28 to provide throttle input signals to all grouped propulsion systems, while engagement of one of modulator arms 30 or 31 results in a throttle reduction signal to be transmitted to the associated propulsion system 11 (for example, pulling trigger throttle halfway results in the 50% throttle signal to be communicated to all grouped propulsion systems 11, but engagement of modulator arm 31 results in a 50% reduction in the throttle signal, producing 25% throttle at the one or more propulsion system(s) associated with modulator arm 31 (i.e. front or back) while maintaining 50% throttle at the remaining propulsion system(s) associated with trigger throttle 28). Base switch 32 is preferably a Z-shaped member that is sized and shaped to engage one or both of arms 30, 31 as desired by the user of joystick 23. As shown in FIG. 5, base switch 32 can be positioned in a neutral position to maintain arms 30, 31 in a corresponding, generally parallel orientation, resulting in equal distribution between the fore and aft propulsion systems 11. When base switch 32 is depressed as represented in FIG. 6, the functional shape thereof accommodates the longer modulator arm 30 within a first void defined by the Z-shape of base switch 32 but a first portion contacts the shorter modulator arm 31, lifting it to a more vertical position than that of modulator arm 30. Although not illustrated, when base switch 32 is engaged and lifted up, for example via the thumb of the pilot, a second portion of base switch 32 contacts the longer modulator arm 30 but fails to contact the shorter modulator atm 31 by virtue of a second void defined by the Z-shape of base switch 32, resulting in modulator arm 30 assuming a more vertical posture relative to modulator arm 31.

FIGS. 2 and 3 demonstrate operational outcomes of the functional control logic realized by selectively manipulating joystick controller 22, trigger members 28, and modulators 29 and the corresponding orientation of the various associated (i.e. grouped) propulsion systems 11. Displacing both joysticks 23 in the same direction laterally or longitudinally relative to base 24 while equally engaging throttle triggers 28 simultaneously produces lift and movement of aircraft 10 in the direction indicated by joysticks 23. This occurs by virtue of rotation of the specific propulsion systems 11 via longitudinal axle 15 (FIG. 2) or wing mount 17 (FIG. 3). Although a single propulsion system is illustrated in FIGS. 2 and 3, respectively, it should be understood that in the preferred embodiment of aircraft 10, all members of a propulsion system grouping act in unison. A turn, also known as yaw, can be achieved by tilting one joystick 23 further in one lateral direction than the other joystick 23, or by leaving the second joystick 23 in the vertical (neutral) position for a yaw of a lesser degree, or by engaging one throttle trigger 28 to a greater degree than the other when all propulsion systems 11 are angled in the substantially similar direction. A "flat" turn may be achieved by manipulating the joysticks 23 in opposing directions, for example tilting the right joystick 23 forward and the left joystick 23 rearward while also engaging the respective throttle triggers 28, producing rotation about a vertical (i.e. z) axis. It should be understood that minute adjustments to correct for ambient wind gusts, weight shift, and the like may be affected by a pilot while in operation as is known in the art. In addition to the operations described above, aircraft 10 can adjustably turn and/or yaw while either stationary (i.e. hover) or in motion. For example, manipulating respective joysticks 23 in opposing directions allows for an adjustable amount of yaw and turning velocity. Returning modulators 29 to the neutral position places propulsion systems 11 vertical with equal amounts of thrust, preventing stall conditions.

A method of utilizing the novel control logic embodied in aircraft 10 may include the step of providing airframe 12 with a plurality of propulsion systems 11 gyroscopically mounted to the external surface and aircraft controller 22 with at least two joysticks 23, each joystick 23 including a throttle control 28 and a throttle control modulator 29 as previously described. A further step includes providing electronic instructions in the nature of software code stored on or executed by computing device 34, which in turn is in communication with aircraft controller 22. The software is instructed, or may configure the plurality of propulsion systems 11 into predetermined groups, preferably defined by the position of respective propulsion systems 11 relative to airframe 12, for example divided between propulsion systems 11 on the left and right sides of the aircraft, respectively. During use, the manual inputs as detected by joysticks 23 are communicated to the corresponding propulsion systems 11, which embody the desires of the user. For example, displacing the left joystick 23 laterally (i.e. left or right of center) causes corresponding rotation of propulsion systems 11 on the left-hand side of aircraft 10 via longitudinal axle 15 to effectuate a left or right slide (i.e. lateral displacement without longitudinal displacement). Similarly, displacing left joystick 23 longitudinally (i.e. forward or rearward of center) causes corresponding rotation of propulsion systems 11 on the left-hand side of aircraft 10 via wing mount 17 to effectuate a front or rear pitch. Further, throttle control 28 and throttle control modulator 29 may be manipulated by the user to reduce, increase, offset, or compensate for various motions experienced by aircraft 10. For example, the banking angle of a roll may be increased or lessened by the user's engagement of throttle controls 28. Further still, the user may alter the throttle distribution between front and rear propulsion systems 11 on the left-hand side of aircraft 10 by positioning modulator arms 30 and 31 in a more vertical or horizontal position, respectively.

The illustrations and examples provided herein are for explanatory purposes and are not intended to limit the scope of the appended claims.

I claim:

1. A vertical takeoff and landing vehicle system comprising an aircraft and a controller,
   the aircraft comprising a plurality of propulsion systems each gyroscopically mounted to an airframe; and
   the controller comprising a pair of joystick controls in communication with the plurality of propulsion systems, the controller configured to:
   electronically group the plurality of propulsion systems relative to their respective position relative to a longitudinal midline defined by the aircraft,
   associate control of each group of propulsion systems with different ones of the joystick controls, and
   rotate each group of propulsion systems about x- and y-axes independent of corresponding rotation defined by any other group, wherein inputs for pitch, roll, yaw, and translation for each group of propulsion systems are decoupled from any other group of propulsion systems.

2. The vehicle system of claim 1 further comprising a wing mount rotatably attached to the airframe, the wing mount supporting one of the plurality of propulsion systems.

3. The vehicle system of claim 2 further comprising an actuator in communication with the wing mount for selective rotation of the wing mount.

4. The vehicle system of claim 2 further comprising a longitudinal axle pivotably connected to the wing mount, the propulsion system mounted on the longitudinal axle.

5. The vehicle system of claim 4 further comprising an actuator in communication with the longitudinal axle for selective rotation of the longitudinal axle.

6. The vehicle system of claim 1 further comprising a plurality of wing mounts corresponding in number to the plurality of propulsion systems, each wing mount rotatably attached to the airframe, each wing mount supporting different ones of the plurality of propulsion systems.

7. The vehicle system of claim 6 further comprising a plurality of actuators, an actuator in communication with each of the plurality of wing mounts for selective rotation of each of the wing mounts.

8. The vehicle system of claim 6 whereby each of the plurality of wing mounts defines a C shape.

9. The vehicle system of claim 6 further comprising a plurality of longitudinal axles, a longitudinal axle pivotably connected to each of the plurality of wing mounts, one of the plurality of propulsion systems mounted on each of the longitudinal axles.

10. The vehicle system of claim 9 further comprising a plurality of actuators, an actuator in communication with each of the plurality of longitudinal axles for selective rotation of each of the longitudinal axles.

11. The vehicle system of claim 9 whereby each of the plurality of longitudinal axles defines a pair of tabs extending perpendicularly relative to an exterior surface of each of the longitudinal axles.

12. The vehicle system of claim 1 further comprising a throttle control mounted to one of the joystick controls.

13. The vehicle system of claim 12 whereby the throttle control is a trigger-style throttle control.

14. The vehicle system of claim 1 further comprising a pair of trigger-style throttle controls, one of the trigger-style throttle controls mounted to each of the joystick controls.

15. The vehicle system of claim 14 further comprising a pair of throttle distribution modulators, one of the throttle distribution modulators mounted to each of the joystick controls in opposing relation to the trigger-style throttle control.

16. The vehicle system of claim 15 further comprising a base switch defined by a Z-shaped member with first and second voids and positioned between each pair of modulator arms, whereby each of the throttle distribution modulators is defined by a pair of modulator arms rotatably connected to the respective joystick control, each of the modulator arms defining differing lengths.

17. A method of controlling an aircraft comprising the steps of
providing vertical takeoff and landing vehicle system of claim 1,
grouping the plurality of propulsion systems relative to respective position in view of the airframe, and
manipulating the controller to produce corresponding adjustment of position at the plurality of propulsion systems, each group of propulsion systems rotatable about x- and y-axes decoupled from corresponding rotation defined by any other group.

18. A vertical takeoff and landing vehicle system comprising an aircraft and a controller,
the aircraft comprising an airframe with four, C shaped wing mounts, the wing mounts rotatably attached to the airframe, each wing mount further comprising:
a longitudinal axle pivotably connected to the wing mount,
the longitudinal axles defining a pair of tabs extending perpendicularly relative to an exterior surface of the longitudinal axle,
an actuator in communication with the longitudinal axle for selective rotation of the longitudinal axle, and
an actuator in communication with the wing mount for selective rotation of the wing mount; and
four propulsion systems gyroscopically mounted to an airframe, each wing mount supporting different ones of the four propulsion systems; and
the controller comprising at least one joystick control defining at least one trigger-style throttle control mounted to the at least one joystick control and a pair of throttle distribution modulators mounted to the at least one joystick control in opposing relation to the trigger-style throttle control, the throttle distribution modulators further defined by pair of modulator arms defining differing lengths, the controller in communication with the four propulsion systems via the at least one joystick, the controller configured to:
electronically group the four propulsion systems relative to their respective position relative to a longitudinal midline defined by the aircraft,
associate control of each group of propulsion systems with different ones of the joystick controls, and
rotate each group of propulsion systems about x- and y-axes independent of corresponding rotation defined by any other group, wherein inputs for pitch, roll, yaw, and translation for one group of propulsion systems are decoupled from the other group of propulsion systems.

* * * * *